United States Patent
Elliott et al.

(10) Patent No.: US 7,403,923 B2
(45) Date of Patent: Jul. 22, 2008

(54) DEBT COLLECTION PRACTICES

(75) Inventors: Michael B. Elliott, Wilmette, IL (US);
Patrick G. O'Neill, Wilmette, IL (US);
Jorge Nocedal, Evanston, IL (US);
Robert Fourer, Evanston, IL (US)

(73) Assignee: Accenture Global Services GmbH, Schauffhauen (CH)

( * ) Notice: Subject to any disclaimer, the term of this patent is extended or adjusted under 35 U.S.C. 154(b) by 666 days.

(21) Appl. No.: 10/011,523

(22) Filed: Nov. 5, 2001

(65) Prior Publication Data

US 2003/0078881 A1 Apr. 24, 2003

Related U.S. Application Data

(63) Continuation-in-part of application No. 09/976,607, filed on Oct. 12, 2001, now abandoned.

(51) Int. Cl.
G06Q 40/00 (2006.01)
(52) U.S. Cl. .......................... 705/38; 705/40
(58) Field of Classification Search .................. 705/35, 705/36, 38, 40
See application file for complete search history.

(56) References Cited

U.S. PATENT DOCUMENTS

| | | | |
|---|---|---|---|
| 5,889,799 A | 3/1999 | Grossman et al. | |
| 5,963,635 A | 10/1999 | Szlam et al. | |
| 6,041,315 A | 3/2000 | Pullin | |
| 6,052,674 A | 4/2000 | Zervides et al. | |
| 6,098,052 A * | 8/2000 | Kosiba et al. | 705/40 |
| 6,456,983 B1 | 9/2002 | Keyes | |
| 7,006,994 B1 | 2/2006 | Campbell et al. | |
| 7,191,150 B1 * | 3/2007 | Shao et al. | 705/38 |
| 2001/0044739 A1 | 11/2001 | Bensemana | |
| 2002/0059139 A1 | 5/2002 | Evans | |
| 2002/0072952 A1 | 6/2002 | Hamzy et al. | |
| 2002/0116245 A1 | 8/2002 | Hinkle et al. | |

(Continued)

FOREIGN PATENT DOCUMENTS

WO PCT/US2003/026753 3/2004

OTHER PUBLICATIONS

Frederick A. Piumelli et al, Power Collecting, 1998, John Wiley & Sons, Inc. pp. 138-143, 158-179, 209-230, and 238-241.*

(Continued)

*Primary Examiner*—Harish T Dass
*Assistant Examiner*—Elda G Milef
(74) *Attorney, Agent, or Firm*—Vedder Price P.C.

(57) ABSTRACT

A method of optimizing debt collection attitudinally classifies debtors into one of several attitudinal segments. The approach uses an assessment of current attitudes rather than past behaviors as to predict future behavior. Each segment can be addressed with an offer, which is a combination of attributes which together, have an expected, measurable, and predictable response from the debtor. Debt collection requires the expenditure of resources, at least one of which the availability of a relatively small number of debt collectors. The offers that can be extended to debtors are identified on a debtor-by-debtor, offer-by-offer basis to identify the best offer to propose to each debtor by the limited number of debt collectors in order to maximize the economic return from all debtors.

8 Claims, 6 Drawing Sheets

U.S. PATENT DOCUMENTS

| | | | |
|---|---|---|---|
| 2002/0123946 | A1 | 9/2002 | Haworth et al. |
| 2002/0188638 | A1 | 12/2002 | Hamscher |
| 2002/0198796 | A1* | 12/2002 | White et al. .................. 705/34 |
| 2003/0018563 | A1 | 1/2003 | Kilgour et al. |

OTHER PUBLICATIONS

Paul L. Meyer, Introductory Probability and Statistical Applications, 1965, Addison-Wesley Publishing Company, pp. 12-13, 20-21, and 106-107.*

William M. Makuch et al, Managing Consumer Credit Delinquency etc, 1992, pp. 90-109.*

Cordell, Larry; Jericho Trianna. "Who Pays, Who Delays and Who Strays". Secondary Mortgage Markets; Dec. 1999; 16, 2; ABI/Inform Global p. 8 (6 pages).*

"The Score on Behavioral Scoring". Credit Union Management. Madison: Jul. 1998. vol. 21, Iss. 7; p. 24, (2 pages).*

Taylor, Peter; Robert Sleight. "Achieving Account Management Goals." Credit Card Management Europe. New York: May/Jun. 1994. vol. 2, Iss. 12; p. 18 (4 pages).*

Palla, Ken. "The Potential of Scoring in International Mortgage Lending". Housing Finance International; Mar. 2000; 14, 3; p. 14 (7 pages).*

Makuch, William M. et al.; Managing Consumer Credit Delinquency in the US Economy: A Multi-Billion Dollar Management Science Application; The Institute of Management Sciences, Jan.-Feb. 1992; pp. 90-109.

International Search Report for PCT/US03/22810.

Zaretsky, Barry L., Setoff Strategies for Collecting Troubled Loans, Commercial Lending Review, Fall 1994, p. 31, vol. 9, Iss. 4, Boston.

Pincetich, Maria and Rubadue, Tom, Creditors Explore New Skip-Tracing Strategies as Delinquencies Reach Record Highs, Credit World, p. 35, Jan./Feb. 1997; 85, 3.

* cited by examiner

| GROUP | DESCRIPTION |
|---|---|
| "NEGOTIATORS" | • TOP PRIORITY IS FLEXIBILITY TO RESTRUCTURE DEBT TERMS<br>• PARTICULARLY VALUE ABILITY TO LENGTHEN DEBT TERM<br>• LOW VALUE ON NICENESS OF AGENT OR CONTACT FREQUENCY<br>• VIEW PROTECTING CREDIT RATING AS IMPORTANT<br>• WANT TO BE CONTACTED ONCE TO RESTRUCTURE DEBT<br>• MODERATELY CONCERNED ABOUT CREDIT RATING |
| "WORRIERS" | • VERY CONCERNED ABOUT AVOIDING LATE PAYMENTS SHOWING UP ON CREDIT REPORT<br>• STRONGLY VALUE ABILITY TO DEFER PAYMENTS<br>• APPRECIATE NICE AGENTS THAT LISTEN TO THEIR PROBLEMS<br>• WANT TO BE CONTACTED AT HOME<br>• DESIRE A FOLLOW-UP LETTER TO CONFIRM PAYMENT STATUS |
| "INDIGNANTS" | • DO NOT CARE ABOUT NICENESS OF AGENT<br>• DO NOT CARE ABOUT CREDIT RATING<br>• DISLIKE FREQUENT CALLS AND LETTERS<br>• VALUE BEING ABLE TO SKIP PAYMENTS<br>• DO NOT RESPOND TO AGGRESSIVE COLLECTION METHODS |

DEBT COLLECTION PRACTICES

RELATED APPLICATION

This is a continuation-in-part of a U.S. application 09/976/607 filed Oct. 12, 2001 now abandoned, for a "Method to Improve Debt Collection Practices."

FIELD OF THE INVENTION

This invention relates to the business of debt collection. In particular, this invention relates to a method for improving debt collection.

BACKGROUND OF THE INVENTION

The extension of credit by lenders and by the sellers of goods and services has in turn created a concomitant increase in debt, a large percentage of which is delinquent (i.e., one or more payments that are due from the debtor under a loan agreement under an installment credit agreement are overdue or late), which over time is eventually considered to be uncollectable or "bad" debt. Creditors regularly attempt to collect debts by way of letters and phone calls to debtors and in some instances, debt is at least partially reduced by repossession of assets that secure a debt.

The process of debt collection has grown into a sophisticated endeavor. Current debt collection processes typically use historical payment and credit data as predictors of future payment likelihood.

FIG. 1 depicts a simplified representation of a prior art debt collection process 100. Extrinsic or external payment data 102, which is typically collected by and available from third party debt collection data services such as Equifax, Inc., Experion, Inc. and others, includes data such as income, debt-to-income ratio, other creditors and a "credit score" which is usually a dimensionless index calculated by the third party credit reporting agency using a proprietary formula to attempt to rate or grade the credit worthiness of the debtor.

In addition to external data 102, prior art debt collection processes used by many creditors also use internal data 104, which is data on a particular debtor that is collected by a creditor. Internal data 104 typically includes the creditor's payment history, his purchase history and contact history.

The payment history 106 typically includes the historical timeliness of required loan or installment payments by a creditor. Payment history data 106 can be valuable in collecting debt if the payment history data 106 shows that a particular debtor is either habitually late or his payments are delinquent, or consistently makes payments on time. Payment history data 106 can be a good indicator of future payment likelihood.

Purchase history data 108 typically includes data of the business relationship with the debtor over time. A long-time customer as evidenced by purchase history data 108 might be treated differently than a new customer. Accordingly, purchase history data 108 is frequently considered during a debt collection effort.

A contact history or record 110 is typically a record of the substance of communications to and from a debtor. Contact history data 110, such as records of conversations with, or correspondence from a debtor, that payment(s) will be forthcoming, but which subsequently proved to be false, can be helpful in determining how to collect an existing debt.

A raw credit score 112 is typically a dimensionless index that is calculated using a creditor-proprietary formula or methodology, the resultant numerical value of which provides some sort of measure of the debtor's credit worthiness. A credit score is based upon historical data and relies upon historical data as a predictor of future payment likelihood.

Contact information 114 typically includes phone numbers, addresses and other information useful in identifying and contacting or locating a debtor.

In the prior art debt collection processes, external data 102 and internal data 104 are analyzed alone or in combination in step 120 in order to determine a risk profile 122 as well as a model of the debtor's behavior 124. In step 130, the task of collecting all or part of debt is assigned to a debt collector or group of debt collectors based upon the risk profile 122 and behavior model 124 of step 120.

A problem with prior art debt collection techniques is that they rely upon historical data in determining whether or not to pursue debt collection as well as the techniques of how to pursue debt collection. Historical facts are not always accurate predictors of a debtor's future behavior nor do historical facts always correctly suggest collection techniques that a debtor will respond to. Almost all creditors have many more delinquent debtors than they do collection agents to pursue debt collection. A method by which a limited number of debt collection agents can be optimally assigned to particular debtors so as to optimize collections would be an improvement over the prior art.

Optimally assigning a limited number of debt collection agents to a much larger number of debtors, requires that consideration be given to how to maximize a creditor's economic realization from the efforts of debt collectors, some of whom might be less effective than others. In addition, consideration must also be given to the various costs that are incurred by a creditor in making any sort of accommodation to a debtor. A method by which debt collection can be optimized over all variables affecting economic realization would be an improvement over the prior art.

SUMMARY OF THE INVENTION

A method of optimizing debt collection includes the steps of classifying a debtor according to empirically-determined attitudinal profile.

The approach uses an assessment of current attitudes as well as past behavior as a tool to predict future behavior. The attitudinal characteristics of debtors are used to classify debtors into different customer segments. Each segment can be addressed with an offer, which is a combination of attributes, which have a measured attitudinal response from the customer. When these attributes are combined in an offer or a message to the debtor, the likelihood of a desired response from the debtor can be estimated. The likelihood of a desired response, given a combination of attributes is non-linear and varies according to attitudinal segment. Therefore, each segment suggests a different debt collection strategy to employ with debtors, as well as a point where the elements of the "offer" or message can achieve the greatest likelihood of payment at a given cost to the institution. Debtors are assigned to a particular segment. Debtors in the same segment are targeted with collection tactics specifically designed for them using information and data obtained from the attitudinal profile so as to yield a favorable result. Debt collectors are also assigned to debtors in particular segments based upon the skill sets and experience of the debt collector, availability of debt collectors having particular skill sets at different times of the day, and the propensity to contact debtors at different parts of the day. In other words, different debt collection strategies are used on different debtors in each segment.

Debt collection strategies are accompanied by an associated risk that the debtor will not perform and fail to repay his or her debt. Risk is numerically calculable.

The method includes the step of identifying debt collection strategies within a predetermined risk value R so as to exclude debt collection strategies that are too speculative to consider. For the debt collection strategies within the risk value R, the method assigns at least one such strategy to each debtor and attempts to collect the debt using the strategy that was assigned to the debtor.

BRIEF DESCRIPTION OF THE DRAWINGS

FIG. 5 depicts three, attitudinal group divisions.

DETAILED DESCRIPTION OF A PREFERRED EMBODIMENT

Figure 1:
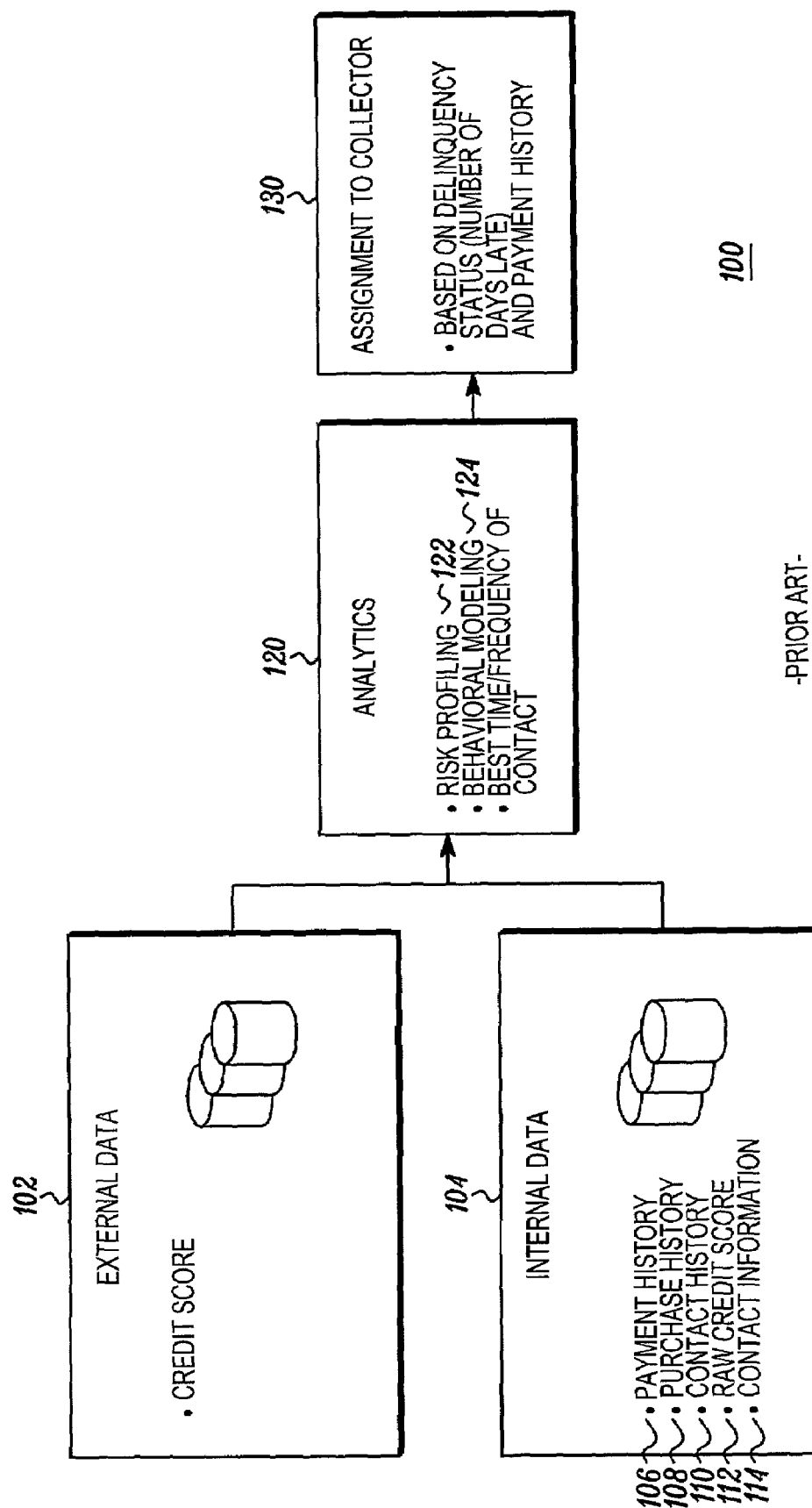
FIG. 1 depicts a prior art method of collecting debt.
Figure 2:
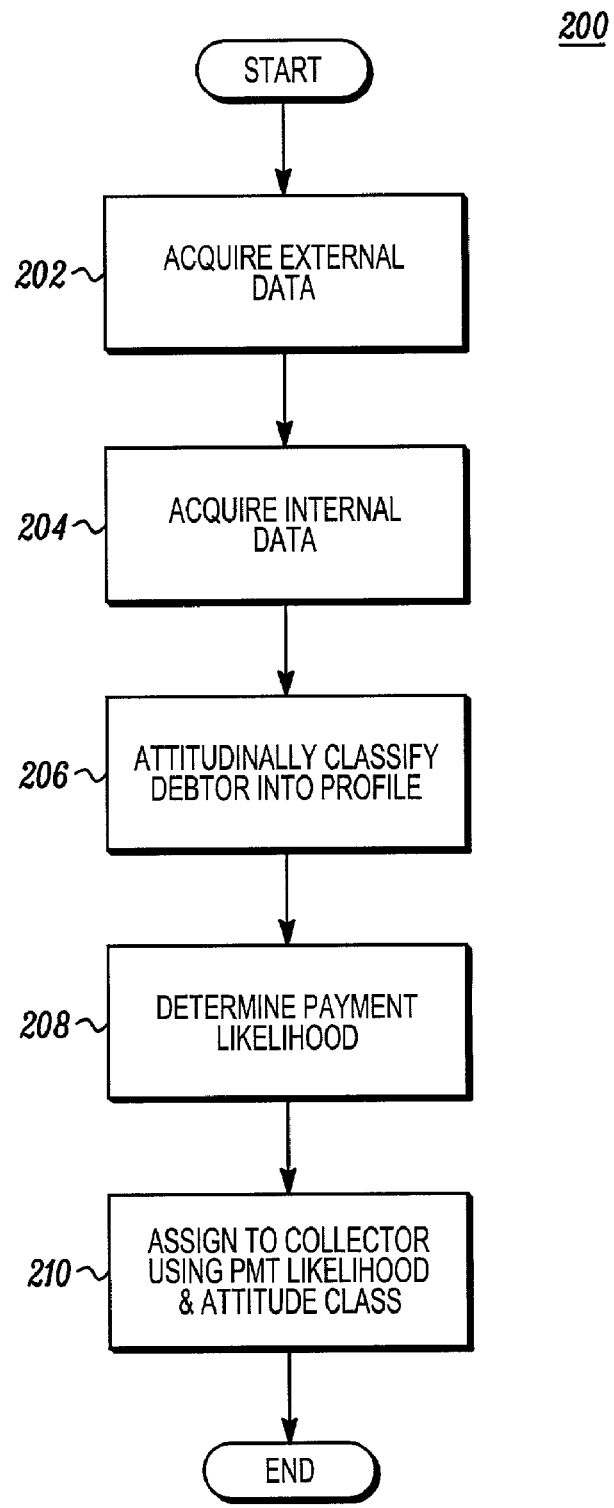
FIG. 2 depicts steps of collecting debt including the step of attitudinally classifying a debtor.

FIG. 2 depicts a flow chart of a debt collection process 200. In the preferred embodiment, the method steps depicted in FIG. 2 are performed by one or more individuals, i.e. not by a computer, however, those skilled in the art of debt collection will appreciate that the steps of the methodology depicted in FIG. 2 could be practiced in whole or in part using an appropriately programmed digital computer.

In the process depicted in FIG. 2, as in the prior art, certain external or extrinsic historical data 202 is acquired, read or otherwise obtained for a particular debtor. Inasmuch as the external data is historical data, the external data can change over time. For purposes of this disclosure therefore, the acquisition of external data step 202 is for a particular time, $T_1$.

External data 202 can include, but is not limited to the debtors: credit score or other credit information; income level; debt to income ratio or debt structure; life events and other demographic data (educational level, profession, address or region of the country where the debtor is located) bearing upon ability to pay for debt and the collection and distribution of which does not violate local or federal laws. The external data acquisition step 202 is to acquire certain historical information, which by experience has been shown to be good indicator of whether future payments will be made by a debtor to his or her creditors and a good indicator of attitudinal segment membership.

In step 204, a creditor will almost always have its own "internal data" such as the aforementioned payment history, purchase history, contact history and a raw credit score calculated from items such as income, debt to income ratio, and payment history to yield a numerical index of the credit worthiness of the debtor. In step 204, internal data, such as payment history, purchase history, contact history and a credit score is acquired for subsequent analysis and processing.

In the preferred embodiment, external data 202 and internal data 204 are acquired from third party credit reporting agencies as well as internally-collected data. Much of the external and internal data is manually acquired and examined, however, automated acquisition of such data could be readily accomplished by a computer reading one or more computer data files, so, for claim construction purposes, steps of acquiring or considering historical payment, should be considered to be equivalent, whether they are performed by a computer or by a person.

In step 206, a debtor is attitudinally classified into one of potentially several different attitude segments, the assignment into each of which at least suggests a particular debt collection strategy or strategies to use or employ with the debtor. In an exemplary embodiment, attitudinal classification 206 is a process (described more fully hereinafter) by which a debtor is empirically classified into one of at least three different types of individual segments. In such an embodiment debtors can be classified as either "negotiators", "worriers" or "indignants" in order of the debtors increasing resistance to debt collection solicitation. Other embodiments of the inventive process can use virtually any number of segments subject of course to the identification or designation of characteristics that define distinctly different segments.

After a debtor has been attitudinally classified in step 206, a likelihood of payment analysis is performed in step 208. The payment likelihood analysis 208 is based upon and derived from the debtor's attitudinal classification.

By way of example, it is generally known among debt collectors that various debtors will respond differently to a creditor's request for payment depending upon whether the creditor offers any kind of concession or assistance to the debtor. Stated alternatively, a creditor's offer to a debtor to extend a payment schedule or a payment due date or perhaps withhold damaging credit history from a credit data collector, might enhance a debtor's willingness pay a debt. These concessions, methods of assistance and treatment tactics can be viewed as attributes of a collection strategy. The survey of debtor attitudes seeks to quantify the value each debtor places on each of these attributes, as well as the preferences for each level within these attributes. For example, concessions can be defined as loan term extensions of 1, 2, 3 or 4 months. Debtor treatment tactics can be defined as full payment or partial payment. For a given debtor attitudinal segment, the ideal combination could be a 2-month extension of term plus a partial payment of the current month's past due amount. By presenting this combination of attitudinal based offer, the debtor would provide a promise to pay, with a high probability that payment will be received by the lender/creditor.

In step 210, responsibility for collection of a debt from the debtor whose external and internal data was collected in steps 202 and 204 and who was attitudinally classified in step 206, is assigned to a debt collection strategy, which includes for example a debt collector, the experience and skill set of which is identified to, and which correlates with, the type of debtor from whom collection is sought. Debt collectors and the strategies that can be used on a particular type of debtor are similarly characterized prior to the debt collector assignment step. Stated alternatively, upon the classification of the debtor's attitude in step 206, and the analysis of payment likelihood in step 208, the responsibility for debt collection will be assigned to a debt collector agent or group of agents using payment likelihood and attitudinal classification in order to find the debt collection strategy best suited or best matched to accomplish the goal of collecting the bad debt.

Figure 3:
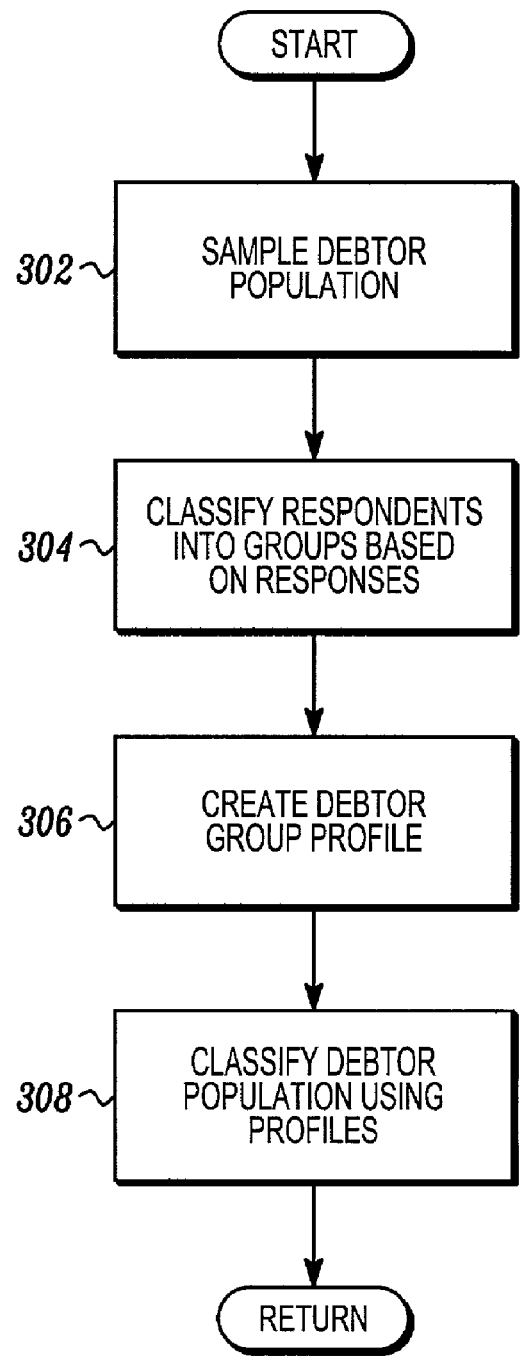
FIG. 3 shows steps of attitudinal classification.

The procedure of attitudinal classification step 206 is illustrated in greater detail in FIG. 3, which shows the steps of an attitudinal classification process 300. Attitudinal classification is accomplished using, among other things, socio-demographic characteristics of debtors.

With respect to FIG. 2 and FIG. 3, it is generally known that sellers of goods and services frequently extend credit to existing and potential customers as a mechanism for generating increased sales. It is also generally known and understood that a seller of certain types or kinds of goods and/or services will frequently have debtor customers who share various demographic characteristics, attitudes and values, among other things.

In step 302, the population of debtors of a particular creditor is first sampled by polling a subset of all debtors in order to determine from a representative sample (i.e. the aforementioned subset) characteristics, attitudes, values and or other information, which they share in common with each other. Sampling a debtor population of a particular creditor to learn of financial-related characteristics enables the creditor to identify from the sample, characteristics that can be used in predicting attitudinal segment membership.

Inasmuch as a particular creditor will generally have groups of debtors with similar repayment priorities and capabilities, the debtor population sampling of step 302 identifies such capabilities and characteristics of all debtors by polling, questioning or interrogating an appropriate cross section, i.e. a sample, of the population of all debtors of a creditor as to their socio-demographic characteristics. In the preferred embodiment, acquiring debtor data in step 302 is accomplished by polling, questioning or interrogating, which can be performed using any appropriate communication method such as direct solicitations in person, by phone or e-mail; questionnaires to the members of the sample population or from data provided to the creditor by debtors on loan or credit applications.

As part of the debtor population sampling of step 302, a creditor needs to obtain from the sample of the debtor population, the debtors' views of or attitudinal responses to different debt collection processes and strategies. By way of example, the sample of the debtors of a creditor can be polled to gauge their responsiveness to different types of collection techniques; their interests in retaining favorable credit ratings; the responsiveness to different payment terms or payment plans, the effect or lack thereof on contact frequency, the effect upon the debtor of the perceived attitude or demeanor of a collection agent and the debtor's interest or willingness to consolidate his or her credit to effect payment to all creditors.

While the preferred embodiment of the methodology disclosed and claimed herein contemplates manually querying the sample of debtors, those skilled in the art of computer programming will appreciate that soliciting information from debtors could be obtained mechanically using for example, automated data collection via a debtor's telephone keypad inputs as responses to questions posed during telephone inquiries or perhaps computer-readable input forms filled out at the time of a credit application.

Once the debtor survey or sampling of step 302 is accomplished, survey respondents and the data acquired from them are used to classify the debtors of a creditor into like groups or categories. In step 304, debtor population sample responses are used to attitudinally classify all members of the population of debtors of a particular creditor into different categories based upon identifying characteristics or attitudes of respondent debtors, hence the claim limitation moniker of "attitudinal classification."

By way of example, and not of limitation, the respondents of sample step 302 who have a particular income level and a particular educational background and who value the maintenance of a favorable credit rating by credit reporting agencies comprise one type of debtor. Such individuals often value the ability to restructure a debt so as to make re-payment possible. Collecting debt from such individuals is usually best handled by appealing to the debtor's preference to pay off a debt by restructuring his or her payment obligations. Another type of debtor might be characterized having a low income level, no or less formal education, ambivalence about a credit rating and an ambivalence toward abusive or abrasive individuals. Such individuals often respond only to the most aggressive collection techniques. Collecting money from such individuals is usually best handled using aggressive collection tactics.

A third category of respondents might be grouped together based upon their admission that they are concerned about credit report or credit worthiness, their importance of their ability to defer payments, their preference for being contacted at home as opposed to at work or on the job, their preference to work with professional collection agents as opposed to abusive or abrasive collectors and their interest in obtaining a follow up written confirmation of a payment plan. Debts from such debtors are usually best collected by appealing to the debtor's concerns about his or her credit rating.

In step 306, three different debtor profiles are created based upon the classification of respondents into three, similar groups or segments. Using the aforementioned examples, the debtor population sampling and their responses to survey questions or inquiries can identify three distinct types of debtors, which for illustration purposes only, could be labeled "negotiators", "worriers" and finally "indignants." The "negotiators" are classified by their reliance or preference for debt payment term flexibility, their interest in extending a payment term, the relative low value they ascribe to the personality or professionalism of the debt collection agent and their preference to be not contacted repeatedly about debt collection. A group of "worriers" are characterized as being overly concerned about a credit report, strongly value their ability to defer payments, appreciate the personality or professionalism or deference accorded by collection agents to them, want to be contacted at home, and prefer a follow up written confirmation of any payment reformulation. A third character of debtor denominated as "indignants" do not care about the personality of an agent, do not care about their credit rating, dislike telephone solicitation calls and do not respond to aggressive collection methods.

Three debtor group profiles, which are arbitrarily denominated herein as "negotiators", "worriers" and "indignants" are used to classify the remainder of the debtor population. In step 308, debtors in the population of all debtors of a creditor are characterized as either negotiators, worriers or indignants using the external and internal data acquired in steps 202 and 204. Stated alternatively, individuals who were classified as "negotiators" will in general have comparable income levels, debt structure, similar life events, similar demographic data, and if they have similar payment history, purchase history and contact history as well as comparable credit scores they will also likely have the same responsiveness to the same or similar debt collection strategies. Similarly, worriers and indignants will all likely have comparable credit scores, income levels, debt structures, life events, payment histories, purchase histories and contact histories as other individuals in the same group. In some instances, debtors of a creditor might need to be unclassified, such as where no external or internal data for a debtor is available. Accordingly, a fourth non-classification profile will frequently be required into which debtors who do not fit any other profile are assigned.

In step 308, each of the debtors of a creditor are classified into at least one profile using the previously acquired data to assign them into one or more attitudinal segments each of which at least suggest a different debt collection strategy to use with respect to each debtor. With respect to FIG. 2, after a debtor is attitudinally classified, the debtor's re-payment likelihood is determined in step 208.

Figure 4:
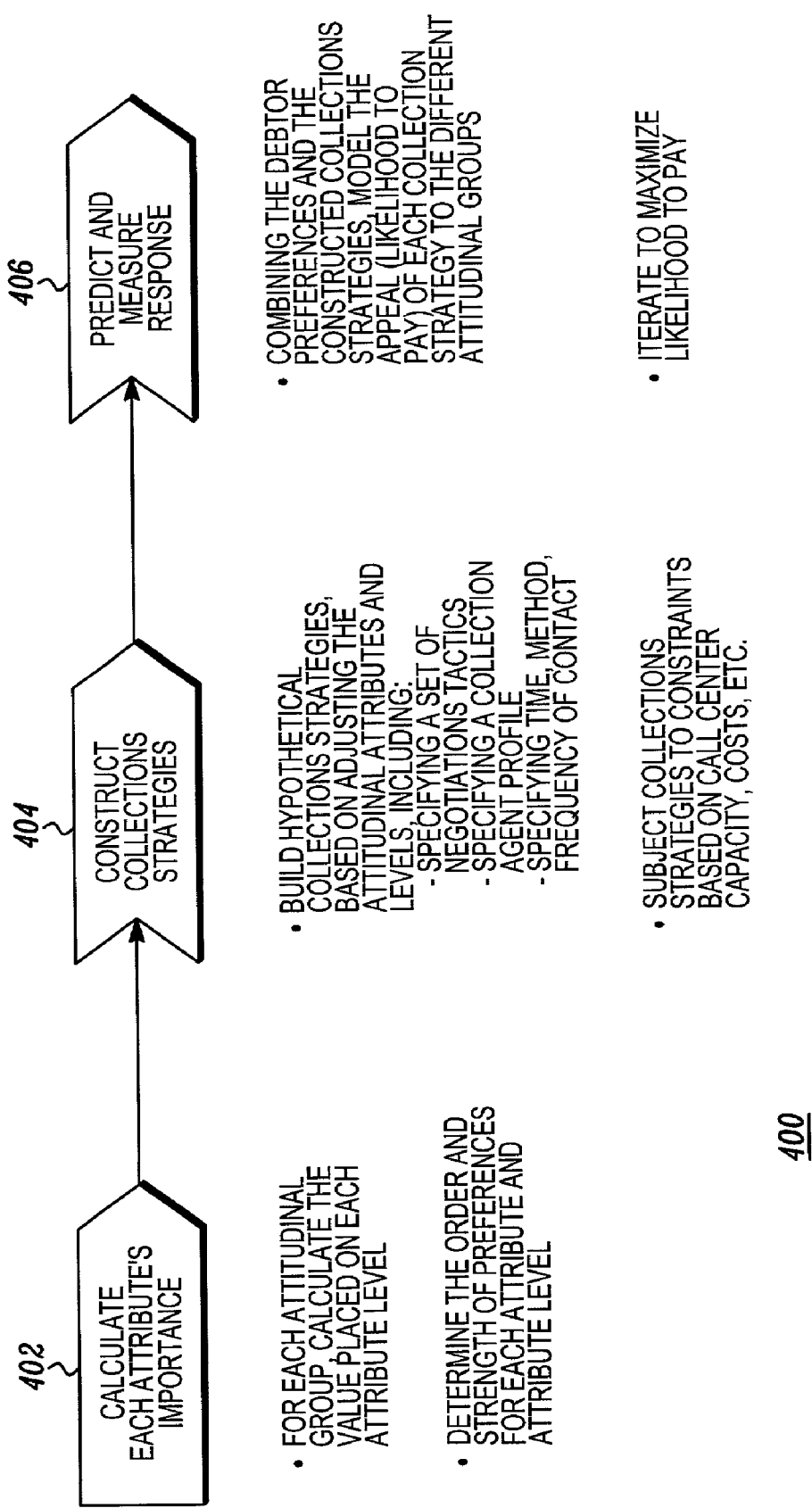
FIG. 4 depicts a method of determining the likelihood of accepting a debt work-out proposal.

FIG. 4 depicts a more detailed depiction of a method 400 of how to determine likelihood of re-payment. In classifying respondents in step 304, their answers to questions or inquiries are used to group debtors together that are related.

In step 402, there is performed a weighting or tabulation of the relative importance placed on each attribute, characteristic or response that was queried in step 304. The "relative importance" of an attribute, characteristic or response is a dimensionless value, but which needs to minimally identify an attribute, characteristic or response as at least either "important" or "unimportant" to the debtor.

In addition to weighting attributes in step 402 the debtor's relative order of importance is also determined by either measuring the responses in step 304 or by directly questioning the debtor as to what the debtor considers to be of most importance to least important.

In step 404, debt collection strategies that comprise a set S, of all useable strategies are identified. Debt collection strategies can include, but are not limited to: telephonic, electronic (e-mail) personal or written inquiries as to when payment from a debtor will be forthcoming; adverse credit data being reported to credit reporting agencies; extensions of a repayment schedule or reformulation of a loan agreement; a creditor's waiver of one or more payments that are overdue or coming due; reclamation of an asset securing repayment; and foreclosure of a right of redemption on a default followed by a forced sale. Other debt collection strategies include taking no action whatsoever and allowing a debtor to self-cure a delinquent debt or alternative contacts such as a letter or e-mail message.

The objective of all debt collection strategies is to recover money that was provided to the debtor as credit by a creditor. Those of ordinary skill in the art of debt collection practices recognize that every debt collection strategy includes some amount of risk of default, i.e., the failure of the debtor to ever repay a loan, such as in a bankruptcy proceeding. The risk associated with a collection strategy is considered to be a scalar R, equal to the outstanding balance of a debtor's account, multiplied by a risk score, multiplied by any change in the duration of an original loan term.

In an exemplary embodiment, the risk of a collection strategy can be expressed as:

$R = f(\text{debtor account balance, risk score, } \Delta \text{ loan term})$.

One exemplary risk calculation is embodied as:

$R = \text{debtor account balance} \cdot \text{risk score} \cdot \Delta \text{ loan term}$.

In the foregoing expressions, a "debtor account balance" is the amount of money that a debtor owes to a creditor; "risk score" is a scalar computed from a debtor's payment history (obtained from a variety sources, such as credit reporting bureaus, creditor internal payment data, etc.) and any increase or decrease in unsecured credit balances over a predetermined period of time. The "$\Delta$ loan term" is the amount of time that a creditor increases an existing loan to a debtor in order to obtain repayment. Those of skill in the art will recognize that alternate embodiments of a risk determination might be formulated.

As the change in duration of a loan term increases, the likelihood that the loan will be fully repaid goes down. Stated alternatively, relatively long-term loans carry more risk than do relatively short-term loans. Anecdotal evidence of increased risk in longer-term loans can be seen in the increasingly higher interest rates charged by lenders for increasingly lengthy loan terms. While long-term loans are considered to be riskier investments, loan payments decrease as loan term lengths increase thereby making long-term loans more affordable to consumers.

Empirical evidence shows that some lending risks are simply too great to incur for the potential profit. Therefore, lenders will refuse to issue certain loans that are simply too risky to make. In order to manage a credit portfolio, the risk incurred in debt collection is defined using the foregoing expression. Lenders establish risk factors above which they will not issue loans or offer debt collection strategies.

Some debt collection strategies might be risk neutral under the foregoing formula. At least one risk-neutral debt collection strategy is simply negotiating with a debtor for payment. Negotiating tactics such as a script to follow when calling a debtor, time of day to call, locations where the debtor should be contacted, threats or offers to convey are some collection tactics that can be additionally selected as part of a collection strategy as well as the personality, education and experience of the collection agent who will ostensibly contact the debtor.

In step 406, the hypothetical collection strategy of step 404, which is intended to be used on (or against) debtors of each debtor profile, is experimentally employed using the members of the debtor population sample that were queried to derive the various debtor profiles identified in step 302 and which were sampled in step 304. In testing the hypothetical collection strategy on a group that it is intended to be used on (or with) the relative effectiveness of the hypothetical collection strategy formulated in step 404 can be tested under a relatively controlled environment comprised of known subjects not unlike those that the strategy is intended to be used on.

In step 406, the hypothetical collection strategy of step 404 is iteratively adjusted if needed (changed by including or deleting tactics) in order to maximize its effectiveness on the debtor profile for which it was developed. After the collection strategy for each debtor profile is maximized by being tested on debtor profile members, its relative effectiveness on debtors of the particular profile can be quantified by measuring the results it obtains from the profile thereby enabling a mathematical prediction of the likelihood of collection.

FIG. 5 depicts a chart 500 of three attitudinal groups which, for purposes of illustration only, depict characteristics of individuals in the various debtor profiles or debtor groups as determined by their responses to the debtor population sampling and querying from steps 302 and 304. As can be seen from FIG. 5, negotiators, worriers and indignants each share certain characteristics that can be useful in soliciting a debt repayment. For individuals whose top priority is to maintain their credit worthiness in the eyes of third party credit reporting agencies, as opposed to individuals who do not care about their credit rating suggest distinctly different methodologies or debt collection strategies to use with each other. A debt collection strategy or strategies depicted in FIG. 4 is developed for each of the debtor profiles shown in FIG. 5. Once the effective debt collection strategies for each debtor profile are developed, deployment of the debt collection strategies is the responsibility of individual debt collection agents or groups of debt collection agents, the qualifications and abilities of which vary considerably. In one embodiment, whether a particular debt collector is considered to be better or worse is objectively determined using data such as the collectors education, skill set evaluations based on demonstrated knowledge of the attitudinal segment characteristics, time on the job but most importantly by the number of dollars collected over time, normalized to yield a relative success rate of the collector working in a given segment, keeping in mind that an objective determination of a debtor's likelihood of repayment or his or her willingness to repay has been heretofore undefined.

Figure 6:
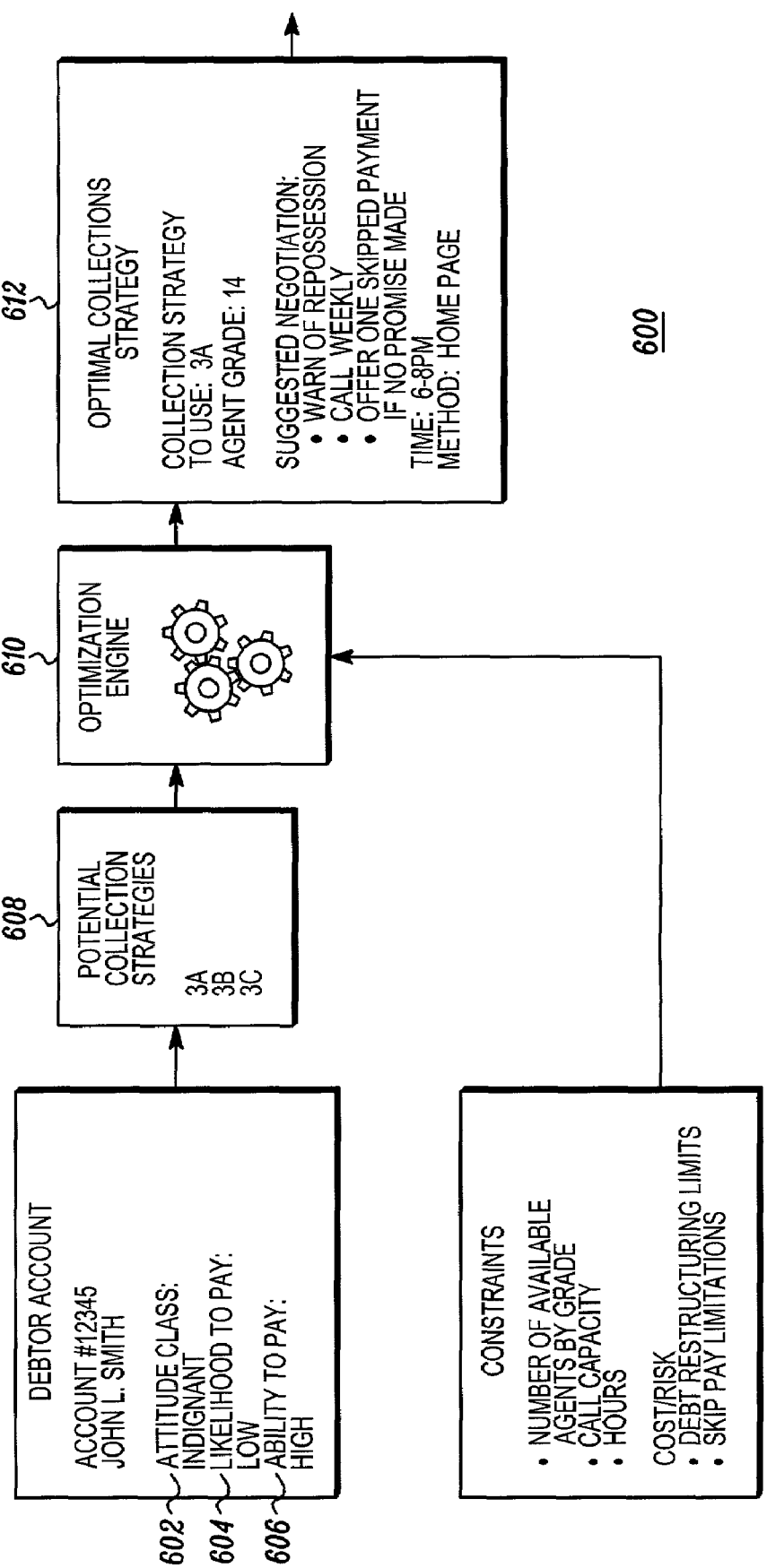
FIG. 6 depicts the steps of a method of assigning a debt collection task to a particular debt collection resource.

FIG. 6 depicts the steps of a method of assigning a debt collection task to a particular debt collection resource or group of resources, for example, a particular debt collection agent of a set of agents by matching debtor profile to debt collector skills. Debt collection strategies include, but are not limited to, a particular script or negotiation technique or tactics that any collection agent should use with the debtor; the method of debtor contact, e.g., telephone, in-person or by mail; the timing and frequency of contacts.

It is well known in the debt collection practice, that different collection strategies will have different effectiveness on different individuals. By way of example, repeated aggressive phone calls are likely to have little or no effect and in fact may impede collection when such techniques are employed against the indignants in the previously mentioned exemplary embodiment. In that same hypothetical, debtors who are classified as indignants might be determined to respond better to debt collection strategies that subtly suggest adverse consequences to nonpayment made by more tactful or diplomatic debt collector agents. Conversely, worriers who are very concerned about credit reporting by third parties, and who strongly value their ability to defer payments will be most responsive to debt collection strategies that tactfully suggest adverse consequences of late payments in a way that the messages unmistakably convey to the debtor, i.e. pay up or face or damaged credit report.

For the negotiator class of debtor, the top priority of which is payment restructuring or payment flexibility, empirical data might suggest that more confrontational collection techniques are more productive.

In FIG. 6, the attitude classification is assigned a descriptive index 602 along with an index of the debtor's likelihood to pay 604. In one embodiment, the classification is a scalar. An ability to pay score 606 is also calculated, based in part on the debtor's income level, to yield another scalar. The attitudinal classification 602, likelihood to pay 604 and ability to pay 606 values point to one or more groups of debt collectors, each of which is assigned into a particular group of debt collectors based upon his or her skill level and collection strategies he or she is instructed to follow.

By way of example, in FIG. 6 a debtor account of a fictitious debtor "John L. Smith" had an attitudinal classification of "indignant", a likelihood to pay score of "low", and an ability to pay score of "high" yielding in step 608 a list of potential collection strategies arbitrarily named "3A" "3B," "3C" etc., each of which may have differing requirements for the use of skilled collectors.

Debt recovery is compromised when the resources available to recover debt (i.e. the debt collectors) are not used optimally. By way of example, an inexperienced debt collector is not as likely to recover money from chronically-overextended and intransigent debtors as is an experienced debt collector who is authorized to present to a debtor possibly more-appealing repayment plans. Optimizing the assignment of debt collectors to debtors can therefore increase economic recovery. In optimizing debt collector assignments to debtors, a true optimization is one that will assign debt collectors to debtors in such a way that the total economic recovery likely to be realized from the total population of all debtors is maximized.

Allocating debt collectors to debtors without regard to the effectiveness of a debt collector, the debtor's repayment likelihood and the risk of no repayment caused by a debt work-out can adversely affect debt recovery. Debt collection is enhanced if the assignment of debt collectors, collection strategies used on particular debtors and the risk posed by each strategy is optimized.

Optimizing debt collection in order to maximize (or at a minimum, increase) a creditor's economic recovery from an entire population of debtors of a creditor will sometimes require that a particular debtor (or debtors) is (are) not pursued as diligently or forcefully as he (they) might be so that other debtors, with perhaps greater debts, can be pursued instead. By way of example, for two hypothetical debtors, $Debtor_1$ and $Debtor_2$ who are identically classified, are equally likely to repay a delinquent loan and have identical repayment capabilities, and who are otherwise identical except for the money they owe to a creditor, a creditor will realize greater economic recovery between $Debtor_1$ and $Debtor_2$ if the creditor pursues repayment from the debtor who owes the largest amount of money, in some instances, even it means foregoing repayment from the debtor who owes a lesser amount. In FIG. 6, an optimization engine 610 represents steps of method by which debt collectors across a population of debtors is optimized so as to maximize (or at least, increase) a creditor's economic recovery from all debtors.

The objective of the optimization of debt collection is to maximize the recovery of money from all debtors in a population of debtors. In a preferred embodiment of the optimization method, a debt collector having a skill level i, is prescribed a time of day j, at which to contact a debtor p, and to employ a predetermined debt collection strategy k, to attempt to recover from the debtor a promise to repay, presumably followed by repayment. The assignment of all debt collectors to debtors, at various times, and using various debt collection strategies is made using constrained optimization techniques of mathematical programming, for example, linear programming, integer programming, mixed-integer programming, quadratic programming, etc. in order to maximize the recovery of the total overall dollars collected in a day's activities.

In order to maximize debt collection by adjusting debt collectors by skill level i, time of day to contact a debtor j, and debt collection strategies used k, a calculation is performed to determine for each skill-time-strategy triple (i, j, and k,) the dollars that can be expected to be recovered or collected, on average, from a debtor p. The expected collection amount of money c for a triple (i, j, k) is denominated c(i, j, k). The total of the expected collection amounts over all triples (i, j, k) is therefore the function to be maximized, subject to certain constraints. The function to be maximized can be expressed as follows:

$$\Sigma_{(i,j,k,p)} c(i,j,k,p) \cdot X(i,j,k,p)$$

where:

i is a scalar that represents different skill levels of collectors;

j is a time of day to contact a debtor so as to actually reach the debtor in order to communicate with him or her;

k is a debt collection strategy used to recover money from the debtor;

p is a debtor from who money is to be recovered using the collection strategy k that is proposed or attempted at time j, and where X(i,j,k,p) is a binary-valued variable that is determined by the result of the mathematical programming process to yield a result across all debtor accounts which maximizes total dollars collected. The effect of X(i,j,k, p) is to select the best i, j, k for debtor p by which the sum of all dollar's collected from all delinquent accounts is maximized.

In the above-identified model, each debtor is preferably assigned only one triple, i.e., one debt collector skill of level i is contacted at only one time of day j and subjected to only one strategy k. For each debtor and his/her associated triple, the total of the expected risk r of all triple/debtor combinations must be less than a user-specified acceptable risk value R, else the debt collection method might fail to maximize return within the user-specified acceptable risk R. Step 612 depicts an exemplary output from the optimization step 610 in which a collection strategy "3A" has been identified and assigned to a debt collector of a "Grade 14." A preferred time to contact a debtor as well as a suggested negotiation tactic or tactics to use during contact with the debtor is also provided. In an exemplary embodiment, skill level i of a debt collector is expressed numerically as the number of promises that were made by debtors to a debt collector, divided into the number of promises that were kept. Stated alternatively, skill level i can be expressed as i=promises kept/promises made.

While the debt collection strategy, time of contact, and even a suggested script that are depicted in step 612 might or might not yield an economic recovery for the debtor on which it is intended to be used, in light of other debtors from whom debt collection is being attempted, the steps depicted in step 612 should be those that optimize the use of debt collection resources to maximize the economic recovery from all debtors.

From the foregoing, it should be apparent that by classifying debtors into one of several different groups, the numbers of each group having similar payment preferences and repayment likelihood makes it possible to project that other individuals of like characteristics and backgrounds will likely perform similarly in response to the same collection techniques. Collection techniques for different classes of debtors are experimentally adjusted for maximum impact by being tested on one or more debtors who can be classified into the group on which a collection strategy will be used. Debt collection strategies used on debtors by a creditor are maximized by determining the strategies for each debtor, which yield a maximum economic return from all debtors.

While the preferred embodiment of the debt collection methodology described and claimed herein contemplates usage by an individual, implementation and practice of the method and the steps thereof could also be performed by suitably programmed digital computer or computer network.

What is claimed is:

1. A method in a digital computing device comprising at least one processor for optimizing debt collection from a plurality of delinquent debtors, the method comprising:
    determining a set of debt collection strategies employable to recover debt from the plurality of delinquent debtors, at least one strategy of which is offerable to each delinquent debtor of the plurality of delinquent debtors; and
    for each delinquent debtor of the plurality of delinquent debtors, assigning a debt collection strategy from the set of debt collection strategies and at least one debt collector having a predetermined skill level i that, when offered to the delinquent debtor, optimizes an expected economic recovery from the plurality of delinquent debtors through differentiation of those delinquent debtors of the plurality of delinquent debtors owing more money as compared to those delinquent debtors of the plurality of delinquent debtors owing less money,
    wherein the predetermined skill level i of the at least one debt collector is expressed as a number of promises by debtors to said at least one debt collector that have been kept, divided by a number of promises by debtors to said at least one debt collector that have been made.

2. The method of claim 1, wherein the plurality of delinquent debtors are within a debtor classification category of a plurality of debtor classification categories as determined by the at least one digital computing device.

3. An apparatus for optimizing debt collection from a plurality of delinquent debtors, comprising:
    at least one digital computing device comprising at least one processor programmed to:
    determine a set of debt collection strategies employable to recover debt from the plurality of delinquent debtors, at least one strategy of which is offerable to each delinquent debtor of the plurality of delinquent debtors; and
    for each delinquent debtor of the plurality of delinquent debtors, assign a debt collection strategy from the set of debt collection strategies and at least one debt collector having a predetermined skill level i that, when offered to the delinquent debtor, optimizes an expected economic recovery from the plurality of delinquent debtors through differentiation of those delinquent debtors of the plurality of delinquent debtors owing more money as compared to those delinquent debtors of the plurality of delinquent debtors owing less money,
    wherein the predetermined skill level i of the at least one debt collector is expressed as a number of promises by debtors to said at least one debt collector that have been kept, divided by a number of promises by debtors to said at least one debt collector that have been made.

4. The apparatus of claim 3, the at least one digital computing device further programmed to place the plurality of delinquent debtors within a debtor classification category of a plurality of debtor classification categories.

5. The method of claim 1, wherein said expected economic recovery is expressed by:

$$\Sigma_{i,j,k,p} c(i,j,k,p) \cdot X(i,j,k,p)$$

where: p is a delinquent debtor of the plurality of delinquent debtors;
c(i,j,k,p) is an expected collection amount;
i is the skill level of a particular debt collector;
j is a time period in a day;
k is a particular debt collection strategy chosen to be used on a delinquent debtor of the plurality of delinquent debtors,
where for each i, j, k, p, X(i,j,k,p) can take either the value 0 or 1 and is determined by optimally selecting i, j and k for all p's.

6. The apparatus of claim 3, the at least one digital computing device further programmed to determine said expected economic recovery as expressed by:

$$\Sigma_{i,j,k,p} c(i,j,k,p) \cdot X(i,j,k,p)$$

where: p is a delinquent debtor of the plurality of delinquent debtors;
c(i,j,k,p) is an expected collection amount;
i is the skill level of a particular debt collector;
j is a time period in a day;
k is a particular debt collection strategy chosen to be used on a delinquent debtor of the plurality of delinquent debtors,
where for each i, j, k, p, X(i,j,k,p) can take either the value 0 or 1 and is determined by optimally selecting i, j and k for all p's.

7. A method in a digital computing device comprising at least one processor for optimizing debt collection from a plurality of delinquent debtors, the method comprising:
    for each delinquent debtor of the plurality of delinquent debtors, assigning debt collection resources in order to optimize an expected economic recovery from the plurality of delinquent debtors,
    wherein said expected economic recovery is expressed by:

$$\Sigma_{i,j,k,p} c(i,j,k,p) \cdot X(i,j,k,p)$$

where: p is a delinquent debtor of the plurality of delinquent debtors;

c(i,j,k,p) is an expected collection amount;

i is the skill level of a particular debt collector;

j is a time period in a day;

k is a particular debt collection strategy chosen to be used on a delinquent debtor of the plurality of delinquent debtors, where for each i, j, k, p, X(i,j,k,p) can take either the value 0 or 1 and is determined by optimally selecting i, j and k for all p's.

8. An apparatus for optimizing debt collection from a plurality of delinquent debtors, comprising:

at least one digital computing device comprising at least one processor programmed to:

for each delinquent debtor of the plurality of delinquent debtors, assign debt collection resources in order to optimize an expected economic recovery from the plurality of delinquent debtors, wherein said expected economic recovery is expressed by:

$$\Sigma_{i,j,k,p} c(i,j,k,p) \cdot X(i,j,k,p)$$

where: p is a delinquent debtor of the plurality of delinquent debtors;

c(i,j,k,p) is an expected collection amount;

i is the skill level of a particular debt collector;

j is a time period in a day;

k is a particular debt collection strategy chosen to be used on a delinquent debtor of the plurality of delinquent debtors, where for each i, j, k, p, X(i,j,k,p) can take either the value 0 or 1 and is determined by optimally selecting i, j and k for all p's.

* * * * *